(12) United States Patent
Gore et al.

(10) Patent No.: US 6,805,747 B2
(45) Date of Patent: Oct. 19, 2004

(54) APPARATUS FOR COATING MEAT

(75) Inventors: Richard E. Gore, Orange, CA (US); Allen Mottershead, Tustin, CA (US)

(73) Assignee: Honey Baked Ham, Inc., Irvine, CA (US)

( * ) Notice: Subject to any disclaimer, the term of this patent is extended or adjusted under 35 U.S.C. 154(b) by 0 days.

(21) Appl. No.: 10/355,384

(22) Filed: Jan. 30, 2003

(65) Prior Publication Data

US 2003/0140847 A1 Jul. 31, 2003

Related U.S. Application Data

(63) Continuation of application No. 09/642,991, filed on Aug. 21, 2000, now Pat. No. 6,513,450.
(60) Provisional application No. 60/150,079, filed on Aug. 20, 1999.

(51) Int. Cl.$^7$ .................................................. A22C 9/00
(52) U.S. Cl. ........................ 118/664; 118/665; 118/667; 118/688; 118/708; 118/13; 118/14; 118/16; 118/24; 426/289; 426/290; 426/292; 426/293; 426/296; 426/307; 99/494; 99/516

(58) Field of Search ................................. 118/664, 665, 118/666, 667, 688, 708, 13, 14, 16, 24, 712, DIG. 4; 426/289, 290, 292–293

(56) References Cited

U.S. PATENT DOCUMENTS

| | | | |
|---|---|---|---|
| 2,405,879 A | 8/1946 | Fredrickson | 118/676 |
| 3,868,979 A | 3/1975 | Leining | 141/159 |
| 6,379,464 B1 * | 4/2002 | Martel | 118/672 |
| 6,513,450 B1 | 2/2003 | Gore et al. | 118/13 |

* cited by examiner

Primary Examiner—Laura Edwards
(74) Attorney, Agent, or Firm—Knobbe, Martens, Olson & Bear LLP

(57) ABSTRACT

A method and apparatus for coating hams is provided. Sugar is uniformly dispensed on an inclined plate that is heated to melt the sugar. The sugar flows into a reservoir from which it is poured onto hams passing below the reservoir on a conveyor. Spices are poured onto the melted sugar that sticks to the ham to form a glaze. Jets of water can cool the glaze to increase retention on the ham. The process can be repeated.

22 Claims, 10 Drawing Sheets

US 6,805,747 B2

APPARATUS FOR COATING MEAT

RELATED APPLICATIONS

This is a continuation of U.S. patent application Ser. No. 09/642,991 filed on Aug. 21, 2000 now U.S. Pat. No. 6,513,450 which claims the benefit of U.S. Provisional Patent Application Ser. No. 60/150,079 filed on Aug. 20, 1999, the entire contents of the above related applications are incorporated herein by reference and made part of the present specification.

FIELD OF THE INVENTION

This invention relates to a method and apparatus for coating meat, such as with a glazing of melted sugar and spices, and is particularly useful for glazing hams.

DESCRIPTION OF THE RELATED ART

Currently hams may be purchased with a spice coating or glazing. The coating is applied by sprinkling a mixture of spices and sugar onto the ham, and using a hand-held blowtorch to melt the sugar which adheres the spice to the ham. Repeated applications of coating material and heating are required to provide a sufficiently thick layer. If the manual heating is too cool in spots the sugar will not melt and stick to the ham. If the heating is too hot, the sugar either burns and becomes very bitter, or it becomes too fluid and runs off the ham. Further, if too hot, the outer layer of the meat can burn.

Manual heating and spice application is thus very uneven, and the resulting coated hams are unevenly coated with glazing and may have a burnt coating or burnt meat. Manual coating is also time consuming and expensive, and results in an inconsistent product.

There is thus a need for a faster way to coat meat such as hams, and to produce meat with a consistent coating.

SUMMARY OF THE INVENTION

This invention provides a method and apparatus for coating hams. The hams are moved along a conveyor path by placing hams on brackets mounted to a conveyor. Sanding sugar is dispensed from a hopper onto a top surface of an inclined plate to distribute the sugar uniformly over the plate. The crystalline sugar is melted by heating the plate with electric or infrared heaters so the top surface of the plate melts the sugar without burning the sugar. A sensor monitors the melting sugar to control the temperature and regulate the melting by controlling at least one of the temperature of the plate and the amount of sugar dispensed onto the plate. Preferably the sensor senses the temperature of the sugar or a property of the sugar on upper surface of the plate to generate a control signal dependent on whether crystalline sugar on the upper surface is melted. The control signal can be used to vary the temperature or the amount of sugar on the plate to prevent burning.

The melted sugar is collected in a reservoir placed below the inclined plate to receive the melted sugar as it runs off the plate. The melted sugar from the reservoir is placed onto the ham as the ham moves along the conveyor. Advantageously, the reservoir rotates to pour the melted sugar onto the ham, and rotates back for filling.

A spice mixture is dispensed onto the melted sugar on the ham while the melted sugar is still hot enough to at least partially melt some of the spice mixture in order to form a glaze. The spice mixture is preferably placed onto the melted sugar, but could be placed on the meat before the melted sugar. Advantageously the glaze is cooled by directing a cooling fluid into contact with at least one of the melted sugar and the glaze. The cooling fluid is preferably a liquid, such as water, but could be other liquids or even a gas. Further, the ham can be coated by changing the direction of the conveyor and dispensing a spice mixture onto the glaze and placing melted sugar from the reservoir onto the ham as the ham moves along the conveyor to form a second layer of glaze. A controller can coordinate the various operations, or switches or sensors cooperating with the conveyor can be used to control the various operations.

The melted sugar partially melts crystalline sugar in the spice mixture to provide a glaze with a non-uniform structure that allows the glaze to break off into small pieces so the glaze can stick to smaller pieces of meat. It also provides a glaze that looks like it is custom applied by hand, and not applied by a machine. The glaze sticks to the upper surfaces of the meat because it is applied by gravity processes, although depending on the viscosity of the melted sugar and spice, some glaze will adhere onto sides of the meat. The method and apparatus produce a glazed ham that looks hand coated, but of more consistent quality, and better quality, than previously available. It does so faster, and with less waste, than hand-coated hams.

According to one aspect of this invention, there is thus advantageously provided a source of unburned but melted, crystalline sugar in sufficient amount to coat at least one piece of meat, and a reservoir in fluid communication with the source of melted sugar and sized to contain a sufficient volume of melted sugar to coat a surface of the at least one piece of meat with the melted sugar. The reservoir preferably has at least one hole located to dispense the melted sugar by gravity onto the meat. A spice dispenser containing spices is located so as to dispense the spices over the meat after the meat has been coated with melted sugar. A jet of water is directed to cool the melted sugar after it has been placed on the at least one piece of meat. Also provided is a conveyor having brackets configured to hold the meat, the conveyor being configured to move the meat along a path below the reservoir opening and spice dispenser at least once.

In a more detailed embodiment of this invention, there is provided an apparatus for coating meat that includes a conveyor traveling a path in a first direction and having at least one bracket configured to hold a piece of meat to be coated. A reservoir configured to hold melted crystalline sugar has at least one opening through which melted sugar can flow to leave the reservoir, with the at least one opening being located above and over a portion of the conveyor path an amount sufficient to dispense melted sugar from the first reservoir onto any meat placed on the brackets as the brackets move along the path below the at least one opening. There is preferably also at least one nozzle in fluid communication with a cooling liquid, with the nozzle being located and oriented to dispense the cooling liquid onto any meat held by the brackets to cool the melted sugar from the reservoir that hits any meat held by the brackets. Additionally, there is a hopper located above and over the conveyor path in an amount sufficient to dispense contents from the second hopper onto any meat held by the brackets, the second hopper being located further along the first direction than the second openings.

Preferably there is also a plate having a heater sufficient to heat the plate to a temperature sufficient to melt sugar, the plate having an upper surface onto which crystalline sugar can be dispensed for melting, the upper surface being located and inclined to direct sugar melted by the plate to the reservoir. It is also desirable to have another hopper located above the plate and having a first opening to receive sugar and a second opening to dispense sugar, the second opening being located above and over the plate to dispense sugar onto the plate during use of the apparatus.

Advantageously, the reservoir is positionable between a first receiving orientation to receive melted sugar from the plate and a second position to dispense sugar through the at least one opening. Advantageously, there are switches or sensors cooperating with the conveyor to change the positioning of the reservoir between the first and second positions.

Further, it is also preferable to have a sensor sensing sugar on the upper surface of the plate to generate a control signal dependent on whether crystalline sugar on the upper surface is melted. The signal can be used to vary the amount of sugar dispensed from the hopper over the plate. Preferably the sensors in communication with the melting sugar on the plate provide a signal used to control at least one of the temperature of the plate and the amount of sugar placed on the plate for melting.

The plate is preferably inclined to the horizontal and has an upper surface facing away from the conveyor and a lower surface facing toward the conveyor. The plate is preferably inclined to the horizontal at an angle in the range of about 20 to 40 degrees, with the plate having an upper surface facing away from the conveyor and a lower surface facing toward the conveyor The heater is preferably located so as to heat the plate, the location of the heater and a thickness of the plate being cooperatively selected to heat the plate to a sufficiently uniform temperature to melt sugar placed on the upper surface of the plate so sugar placed on the heated plate reaches a flowable state.

There is also provided a method for coating a piece of meat. The method includes the steps of continuously melting sugar without burning it by applying heat to an inclined surface on which the sugar is melted so the sugar runs off the inclined surface. Preferably, the sugar is sanding sugar. The melted sugar is collected in a reservoir as the melted sugar runs off the inclined surface. The meat is coated as it moves along the path by pouring the melted sugar from the reservoir onto a top side of the piece of meat. Preferably, the meat is moved along a conveyor path during the coating step.

Further, the meat is advantageously coated with a spice mixture containing granular sugar, either before or after the sugar coating step by dispensing the spices onto the meat at a location which contacts the melted sugar, the melted sugar being hot enough to melt some of the granular sugar on the meat. Preferably, the spice mixture contains granular sugar. The method includes the further step of cooling the melted sugar by placing a cooling liquid into contact with the melted sugar Advantageously, the step of melting sugar includes the further step of regulating the melting of the sugar by sensing a property of the sugar on the inclined surface and varying at least one of the temperature or the amount of sugar placed on the surface. Further embodiments include the step of heating the reservoir to maintain the melted sugar in a desired melted condition and may include the further step of moving the conveyor to pass the piece of meat at least twice through the melted sugar and spice coating steps.

BRIEF DESCRIPTION OF THE DRAWINGS

These and other features and advantages of the invention will become apparent with respect to the drawings, in which like numbers refer to like parts throughout, and in which.

DETAILED DESCRIPTION OF THE PREFERRED EMBODIMENT

Figure 1:
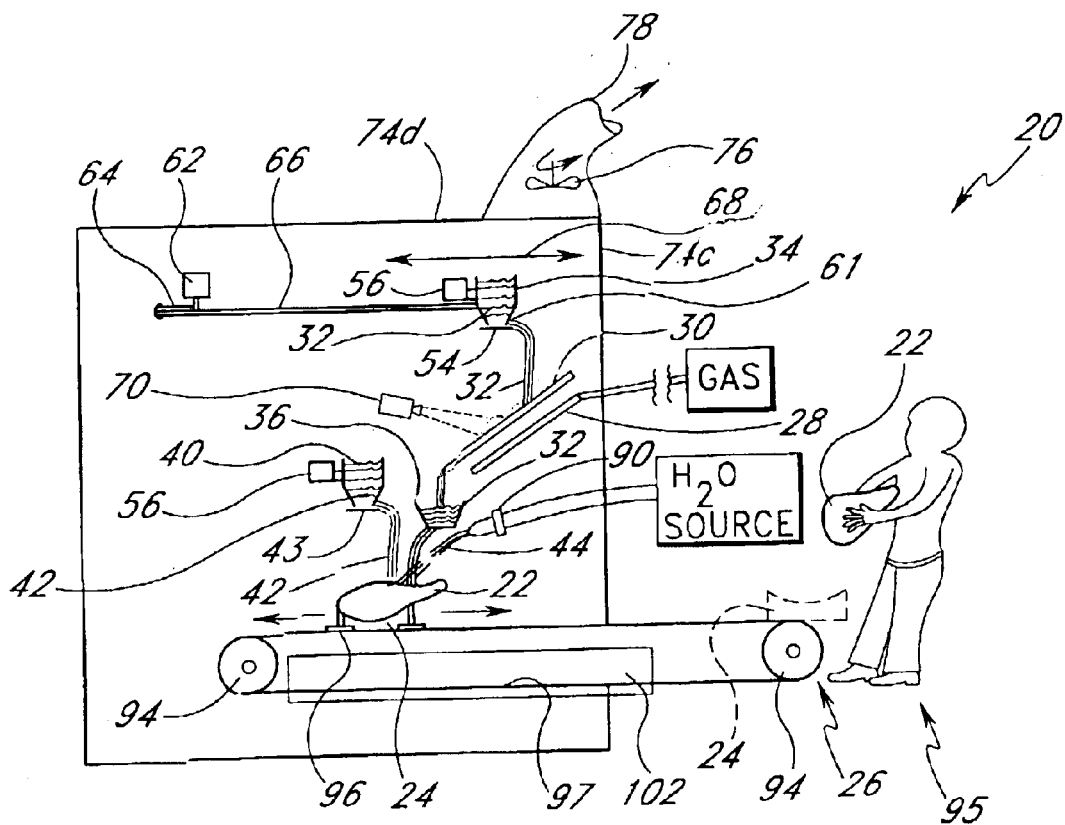
FIG. 1 is a plan, side view of the apparatus for coating meat of this invention.
Figure 2:
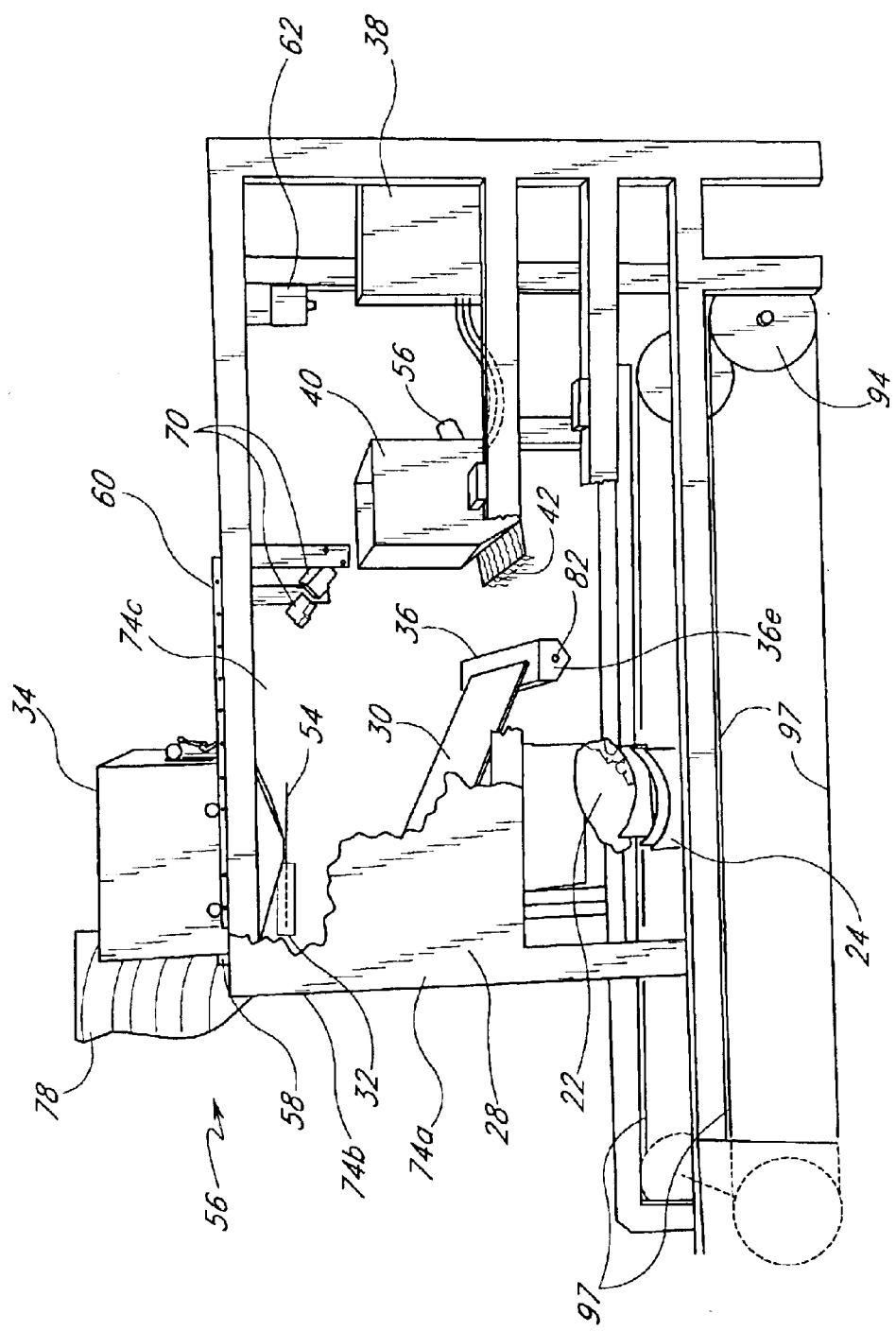
FIG. 2 is a pictorial side view, of the apparatus of FIG. 1 from the opposing side of FIG. 1.
Figure 3:
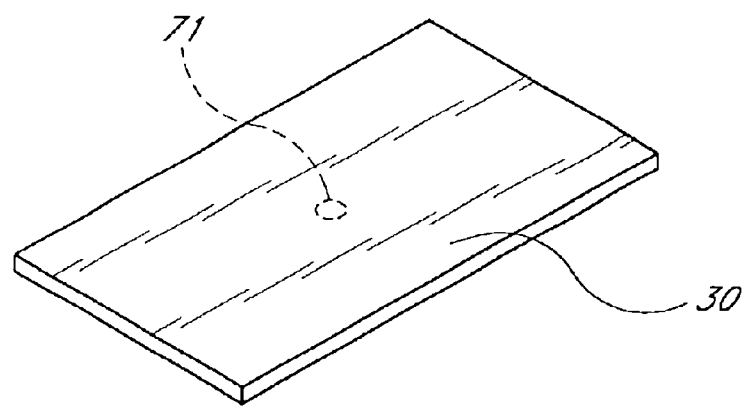
FIG. 3 is an exploded perspective view of the heaters and heating plate as used in FIG. 1.
Figure 3:
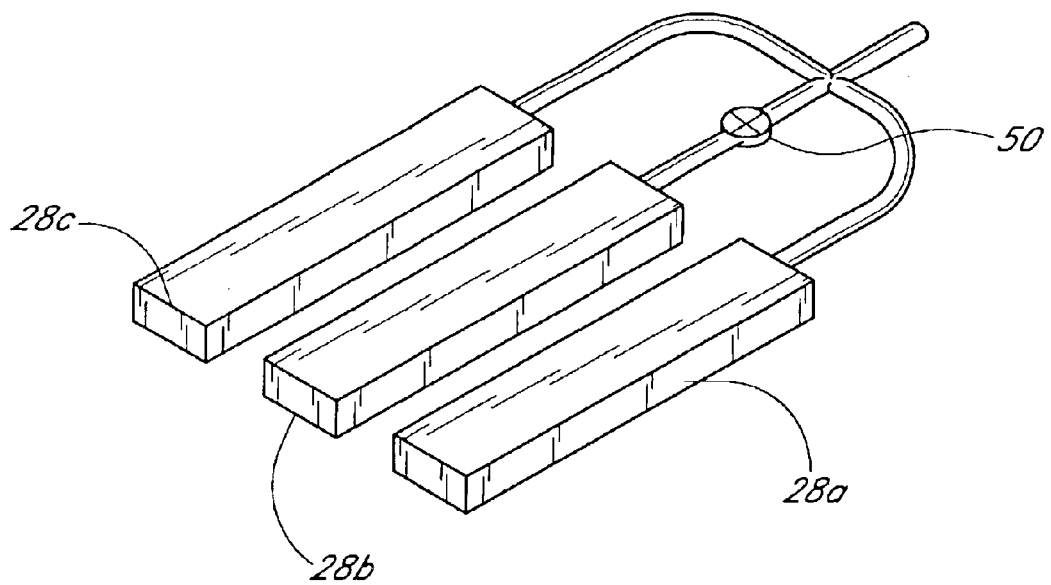

Referring to FIGS. 1–2, an apparatus 20 is shown for coating a piece of meat 22. For illustration, the meat 22 will be referred to as a ham, although other pieces of meat could be used. By way of overview, the ham 22 is placed on racks 24 on a conveyor 26. A heater 28 is located so as to heat an inclined plate 30 onto which an unmelted coating substance 32 is dispensed by a first hopper 34 that moves over the plate 30 to distribute the unmelted substance 32. Preferably the substance 32 comprises sugar, and it will be referred to as such.

The sugar 32 melts on the plate 30 and drains off the incline into a reservoir 36. When a sufficient amount of melted sugar accumulates in reservoir 36, the sugar is dispensed from the reservoir onto the ham 22. Preferably the ham 22 passes below the reservoir 36 so that by tipping the reservoir 36 the melted sugar 32 pours out of the reservoir 36 onto the ham passing below the reservoir. The conveyor 26 carriers the ham 22 below the reservoir 36.

A second hopper 40 contains a spice mixture combined with the unmelted substance, e.g., sugar, 32. This combination of spice and unmelted substance will be referred to as spice mixture 42. The second hopper 40 dispenses the spice mixture 42 onto the ham 22 adjacent to the location where the melted sugar 32 is poured onto the ham so the melted sugar 32 helps the spice mixture stick to the ham.

Advantageously, a jet of cooling liquid 44, preferably water, is sprayed onto the ham at the location where the melted sugar 32, or the spice mixture 42, or both, are placed onto the ham 22. This cools the combination of the spice mixture 42 and the melted sugar 32 and helps it stay on the ham 22.

Advantageously the conveyor 26 carries the ham 22 through the stations where the melted sugar 32 and the spice mixture 42 are each applied, and then reverses direction to pass back through for another coating of spice mixture 42 and melted sugar 32. A desired number of such passes can be made until a desired thickness of coating is achieved on the ham 22, whereupon the conveyor 26 carries the ham to an unloading station where the ham is removed from the conveyor. A more detailed description of the above described items is given below.

Melting Apparatus

Referring to FIGS. 1–3 and 7, the plate 30 is shown as a flat plate. A plate about 1 inch (2.5 cm) thick, about 28 inches wide and 30 inches long is believed suitable. The dimensions can vary depending on the amount of melted sugar 32 that is needed and the heater that is used. The plate 30 is advantageously inclined so that as the sugar 32 melts, it runs off a lower end of the plate and into reservoir 36. The angle will vary with the particular design and the plate 30 could be horizontal if a mechanism were provided to remove the melted sugar from the plate. But an angle of about 20–40° to the horizontal is believed desirable. Advantageously an angle of about 25–35° degrees, and preferably about 30° to the horizontal, is believed suitable for the above described plate 30.

The plate 30 must be heated to a temperature high enough to melt the sugar 32, but not high enough to burn the sugar. The plate may be heated by various ways, such as electrical resistance heating or gas heaters. Electrical heaters require high voltages and currents that present safety issues for operating personnel. For the illustrated embodiment, a gas powered, atmospheric burner, infrared heater 28 is believed preferable. These heaters resemble rectangular boxes a few inches thick, with a gas inlet at one end of the heater. Advantageously three such heaters 28a–c (FIG. 3) are used, each spaced the same distance below the back of the plate 30 and equally spaced across the width of the plate 30. Heaters 28a–c are about 60,000 BTU each have been found suitable. Each of the heaters 28a–c is normally powered at a constant full-on condition, or off. A valve 50 (FIG. 3) may be installed in the gas line to the middle heater 28b to shut off the middle heater for temperature control. Of course ideally, each heater 28a–c could be separately controllable as to the amount of heat produced in order to better regulate the temperature of the plate 30.

Figure 9:
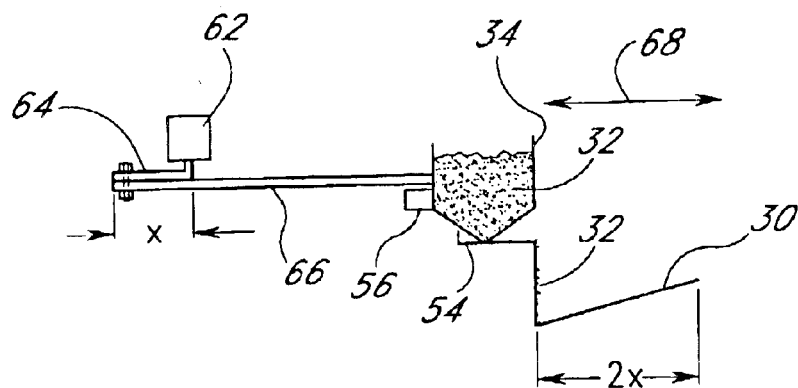
FIG. 9 is a schematic side view of a drive mechanism for the first hopper and the heating plate of FIG. 1.

Referring to FIGS. 1–2 and 9, the first hopper 34 holds and dispenses the unmelted sugar 32 which is dispensed by gravity down onto the plate 30. The hopper 34 advantageously holds a large amount of unmelted sugar 32, about five bags, or 250 pounds. The raw, unmelted sugar 32 is preferably sanding sugar rather than granulated sugar or confectioners sugar. The bottom of the hopper 34 has a cross-section that forms a "V" shape, with a slot at the bottom through which the sugar passes onto a flat or slightly inclined pan 54. One or more vibration units 56 are mounted on the hopper 34 to shake the sugar 32 from the pan 54 and off a distal edge of the pan 54 at a controlled rate. The hopper 34 is about as wide as the plate 30, and has rollers 58 (FIG. 2) connected to opposing ends of the hopper so the hopper can roll along tracks 60 placed above, and on opposing sides of, the plate 30. The pan 54 is about as wide as the plate 30 so as to provide a stream of unmelted sugar 32 from edge to edge across the width of the plate 30.

The rate at which the sugar 32 flows out of the hopper 34 will vary with the level of sugar in the hopper 34. If the hopper is full, the weight of sugar above the opening at the bottom of the hopper will cause a greater flow rate than when the hopper is empty. The power to vibration units 56 is preferably adjusted to compensate for this uneven flow rate, so that a constant amount of unmelted sugar 32 leaves the hopper 34 and its pan 54. Commercially available vibration units 56 operating at 60 cycles, with about 0.05 inch maximum travel, are believed suitable.

A sensor 61 is placed in the hopper 34 to detect when the hopper is empty. If the sensor detects an empty hopper, or a minimum amount of sugar, then an audio and/or visual warning signal is given. If the hopper 34 runs out of sugar to put on the plate 30, the plate will overheat and burn the sugar. Preferably, the heater(s) 28 are shut off if the level of sugar in the hopper 34 is too low. This can be achieved by a signal from the sensor 61 to a computer or programmable logic controller (PLC) 38 to a shut-off valve 114 (FIG. 10) on the gas line to the heater 28, or a signal from the sensor 61 directly to the shut off valve.

The hopper 34 is moved over the plate 30 by a drive mechanism. A motor 62 has a drive shaft connected to an eccentric 64 to rotate the eccentric 64. The distal end of the eccentric 64 is connected to a first end of linkage 66 with the second end of linkage 66 being connected to hopper 34 so that rotation of the motor drive shaft and eccentric 64 causes the linkage 66 to reciprocate the hopper 34 along the length of the plate 30 on tracks 60. Thus, the hopper 34 dispenses unmelted sugar 32 onto plate 30, with the hopper 34 being reciprocated along the length of the plate 30 to distribute the sugar over the surface of the plate. The length of eccentric 64 is about half the length of plate 30 projected onto a horizontal plane, as reflected in FIG. 9. Arrows 68 in FIGS. 1 and 9 indicate this reciprocation. Advantageously, the eccentric 64 and linkage 66 are selected to cause the sugar 32 to be dispensed only on the plate 30 to avoid wasting sugar.

The heater 28 heats plate 30, onto which the hopper 34 dispenses unmelted sugar 32 in order to produce a source of melted sugar. The heater 28 advantageously heats the plate 30 to a temperature sufficient to melt the sugar 32, but not hot enough to burn it, which is difficult to achieve. Sugar has a high carbon content with a poorly defined melting point and specific heat. The melting temperature can also vary with the humidity in the air that is absorbed by the sugar. It effectively transitions from a solid to a liquid over a wide temperature range.

Further, if the sugar 32 is placed on the plate 30 unevenly then the melting sugar will absorb the heat from the plate unevenly and can result in temperature variations over the plate 30 leading to burning or uneven melting. If the plate 30 has a hot spot or an uneven amount of sugar 32 on it, the sugar can burn causing the high carbon content of sugar to produce an unpleasant taste detrimental to the coating of the ham 22. If the plate gets a cool spot, unmelted sugar will accumulate or clump, causing melted sugar to flow around the clump and resulting in an area downstream of the unmelted clump that is devoid of sugar. That area becomes hot and leads to burning the sugar. A similar clumping or caking occurs if the sugar burns. Thus, an even temperature on the top surface of the plate 30 is desired along with an even distribution of unmelted sugar 32 to achieve a constant source of melted but unburned sugar. The heater 28 is controlled to provide even temperature, and the hopper 34 is controlled to provide a uniform distribution of sugar 32 uniformly over the plate 30.

Depending on the volume of melted sugar that is desired, various parameters can be changed. The rate at which unmelted sugar 32 is dispensed onto the plate 30 can be regulated by the vibration unit(s) 56 and the incline of the pan 54. The amount of vibration from vibration unit(s) 56 can be altered by varying the power to the unit(s) 56, and is thus more readily adjusted than the incline of the pan 54, which is typically fixed and not readily altered. The granularity of the unmelted sugar 32 greatly affects the burning of the sugar, as the smaller the granules, the more sensitive the sugar is to burning, and the narrower the permissible temperature range of the plate 30. Thus, sanding sugar is used.

The hopper 34 makes one complete back-and-forth pass about every seven seconds in the specifically described embodiment. But the rate at which the hopper 34 reciprocates over the plate 30 can be varied by the operational speed of motor 62. Moreover, the speed with which the linkage drive mechanism moves the hopper 34 over the plate 30 varies in a sinusoidal time sequence, with slow speeds and longer dwell times when the distribution stream of unmelted sugar 32 is over the ends of the plate 30, and maximum speed and short dwell times when the stream of unmelted sugar 32 is over the middle of the plate 30. This will result in more unmelted sugar being distributed at the ends of the plate unless something is done to compensate for the speed variation and unequal distribution. In practice, it is believed suitable to put a mechanical shut-off switch so it is hit by the drive linkage 36 each revolution in order to shut off the power to the vibration unit(s) 56 about three inches before the end of the reciprocating stroke in order to decrease the amount of sugar dispensed from pan 54 onto heating plate 30. Ideally, the vibration unit(s) 56 are controlled to stop or retard the vibration and decrease the resulting distribution of unmelted sugar 32 at the ends of the plate 30. Ideally, the vibration unit(s) 56 are normally set to provide an even distribution of unmelted sugar 32 onto the plate 30, which effectively requires a power distribution in a cosine time sequence. Other drive mechanisms can be used, and suitable compensation mechanisms or controls developed in order to distribute unmelted sugar 32 over the plate 30 in a uniform manner.

Other factors that affect the amount of sugar 30 that is dispensed onto plate 30 are the inclination angle of the plate 30 and the heat applied by heater(s) 28. The greater the amount of heat applied to plate 30, the hotter the plate 30, and the greater the amount of sugar 32 that must be supplied to avoid burning sugar. The greater the angle of inclination of the plate 30, the faster the melting or melted sugar 32 will run off the plate 30. Of course the greater the amount of melted sugar 32, the more pieces of ham 22 that may be coated.

For the specifically described embodiment with the 28×30 inch plate at about 30° with three heaters 28 heating the plate 30 to about 480° F., about 3–4 pounds per minute of melted sugar 32 can be produced. For that configuration, temperatures from 450° to 500° F. are usable, but temperatures of about 470° to 490° F. are safer and thus preferred. A plate 30 as specifically described, at about 400° F., will produce about 0.1 pound of melted sugar per minute. At 470° F., about 4 pounds per minute of melted sugar will be produced.

In order to better control the temperature of the plate 30 a temperature control is preferably used. Various sensors can be used to monitor either the temperature of the plate 30 or the sugar 32 as it is melted by the plate. Advantageously, this temperature control uses sensors 70 to measure the temperature of sugar 32 or a property of the sugar 32 melting on the plate 30 which is correlated to temperature of the melted or melting sugar 32. This is accomplished by using infrared sensors 70 directed toward the top surface of plate 30, toward an interior portion of the plate 30, where raw sugar 32 is melting.

The sensors 70 are advantageously selected to detect the granularity of the raw, unmelted sugar 32. The granular sugar 32 reflects more radiation to the detector and indicates a need to either increase the temperature, or to slow down the addition of sugar 32. If there are no granules of sugar 32 detected, that indicates melted sugar and the need to either lower the temperature or the need to add sugar. The detector can be located various places, but is advantageously located in the sensor 70 adjacent the IR emitter, in order to reduce the number of housings for components. A sensor 70 monitoring about 4 square inches of the plate 30 is believed suitable. Preferably, there are two sensors 70, at about the middle of the length of the plate 30, each at about the center of a half-section of the plate. Other locations and numbers of sensors can be used.

The signal from the sensor 70 is used to control the rate at which unmelted sugar 32 is added to the plate 30, with more sugar being added as the plate temperature increases, and less being added as the plate temperature decreases. The temperature of plate 30 can be controlled by shutting off the middle burner 28b. The power to the vibration unit(s) 56 can be used to vary the amount of sugar onto the plate 30. The power can be adjusted by a computer or programmable logic controller (PLC) 38 in response to signals from sensor(s) 70. The computer or PLC 38 can also control the operation of the motor 62 reciprocating the hopper 34, and the power to the vibration unit(s) 56 to compensate for other system aspects, such as the sinusoidal speed variation, and the heaters 28.

Advantageously, the sensor(s) 70 are off during startup, until the temperature of the plate 30 reaches about 470° F. as determined by a thermocouple 71 in the plate 30. The sensor(s) 70 are set to maintain the flow of sugar 32 at a predetermined value, depending on the amount of melted sugar 32 desired and the set point of the burner temperature controller. Up to this temperature, from about 400° F., the vibration that determines the amount of sugar deposited on the plate 30 is determined by the temperature of the plate, increasing linearly from some minimum level at about 400° F. to a selected value (that is preferably set manually) at the set point of the temperature controller, typically about 470° F.

When the sensors 70 take over they seek to maintain a defined level of sugar on the plate. If too much melted sugar is on the plate 30, as indicated by too much reflected radiation from the melted sugar 32, then signals from the sensors 70 are used to reduce the vibration of vibration units 56 and pan 54 causing less sugar to be dispensed onto plate 30. Conversely, if too little sugar is detected by sensors 70, the vibration is increased causing more granulated sugar to be dispensed onto plate 30. The temperature of the heaters 28 are preferably set to maintain the temperature of the plate at about 470° F. and the amount of sugar is controlled to prevent burning or too much unmelted sugar, rather than varying the temperature to prevent burning or to melt sugar faster.

If, for some reason, too little sugar falls onto the plate 30, the sugar can boil, producing bubbles that reflect radiation and can be mis-read as granules of sugar that require either less sugar or more heat—just the opposite of what is needed. Thus, the sensor 70 must be calibrated relative to the condition of the melted or melting sugar 32, and calibrated relative to temperature. But the temperature of plate 30 is advantageously controlled so the sugar 32 does not bubble as it melts, thus avoiding the problem. Limiting the temperature to about 490° F. as determined by the sensor 70, is believed desirable to avoid boiling.

The sensors 70 are advantageously mounted to a frame 72 around and supporting the plate 30. Advantageously the sides and back of the plate 30 and heaters 28 are enclosed by side walls 74a–b and back wall 74c to enclose the heat from plate 30 and burners 28, and to prevent people from getting burned. Preferably at least a portion of the top over the plate 30 is also enclosed by top wall 74d. The top wall 74d must allow for movement of the reciprocating first hopper 34, so all of the top cannot be enclosed. But advantageously the remaining area vertically above a majority, if not all of the plate 30, is covered by top wall 74d.

A fan 76 (FIG. 1) in fluid communication with the enclosure surrounding the plate 30, draws heated air and gases out of the enclosure and vents the exhaust gas through appropriate environmental filters (not shown) to the atmosphere. The fan 76 is also preferably in fluid communication with the exhaust from heater(s) 28 to exhaust the fumes from the burners. If the fan 76 is strong enough, then a smaller top wall 74d is suitable. Advantageously, the fan 76 is located vertically above the back portion of the plate 30 to exhaust gases from the inclined plate 30 and the heater(s) 28. The enclosure formed by frame 72 and sides 74a–d advantageously forms an enclosure that helps exhaust gases through fan 76 and vent 78.

There is thus advantageously provided a means for providing a constant source of melted sugar which basically comprises a heated plate, at least one mechanism for distributing sugar evenly over at least a portion of the plate (multiple sugar dispensers can be used on a single plate), and a temperature control for preventing burning of the melted sugar on the plate. Advantageously about 3–4 pounds per minute of melted sugar 32 are produced, with the amount being variable depending on the number of hams 22 to be glazed.

Reservoir

Figure 6:
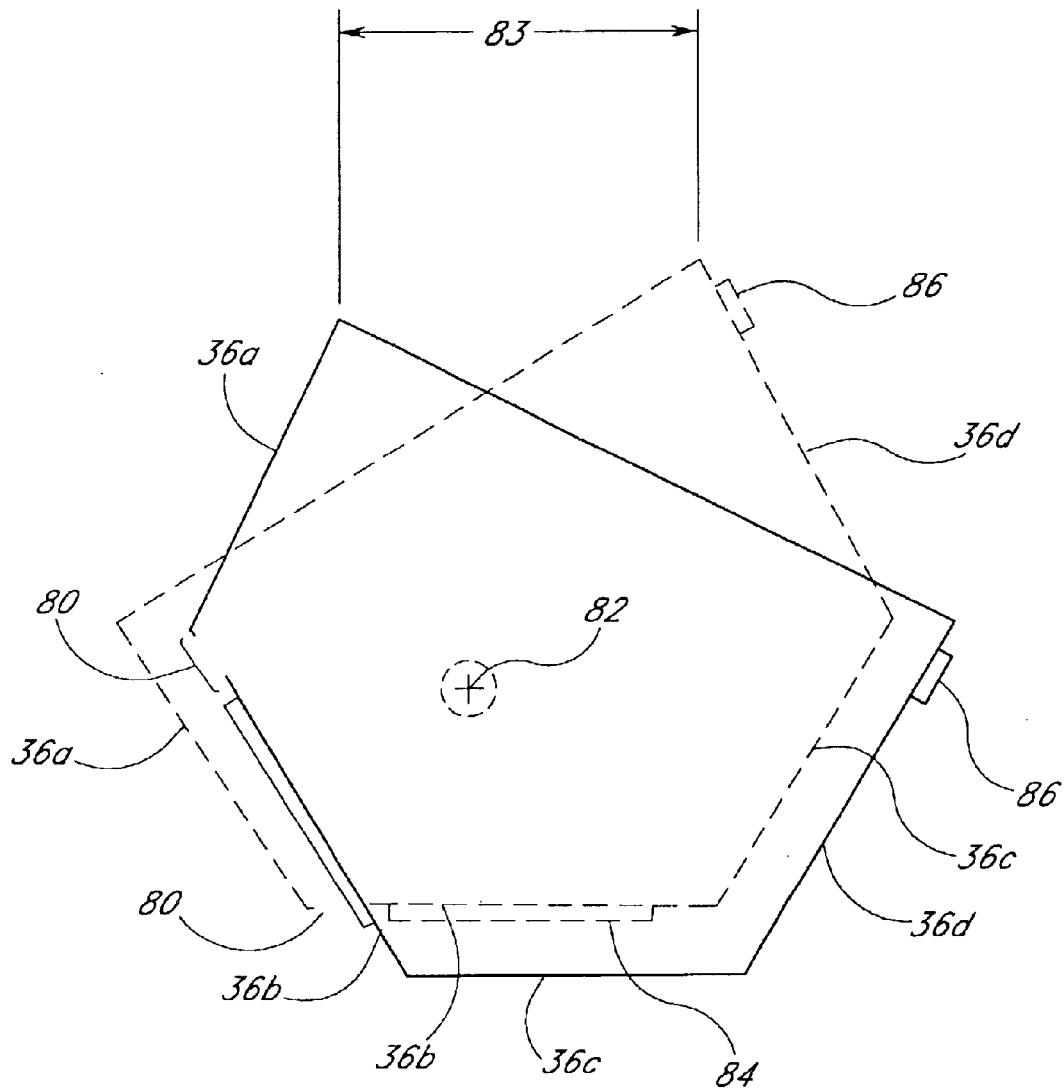
FIG. 6 is a side view of the reservoir of FIG. 5.
Figure 7:
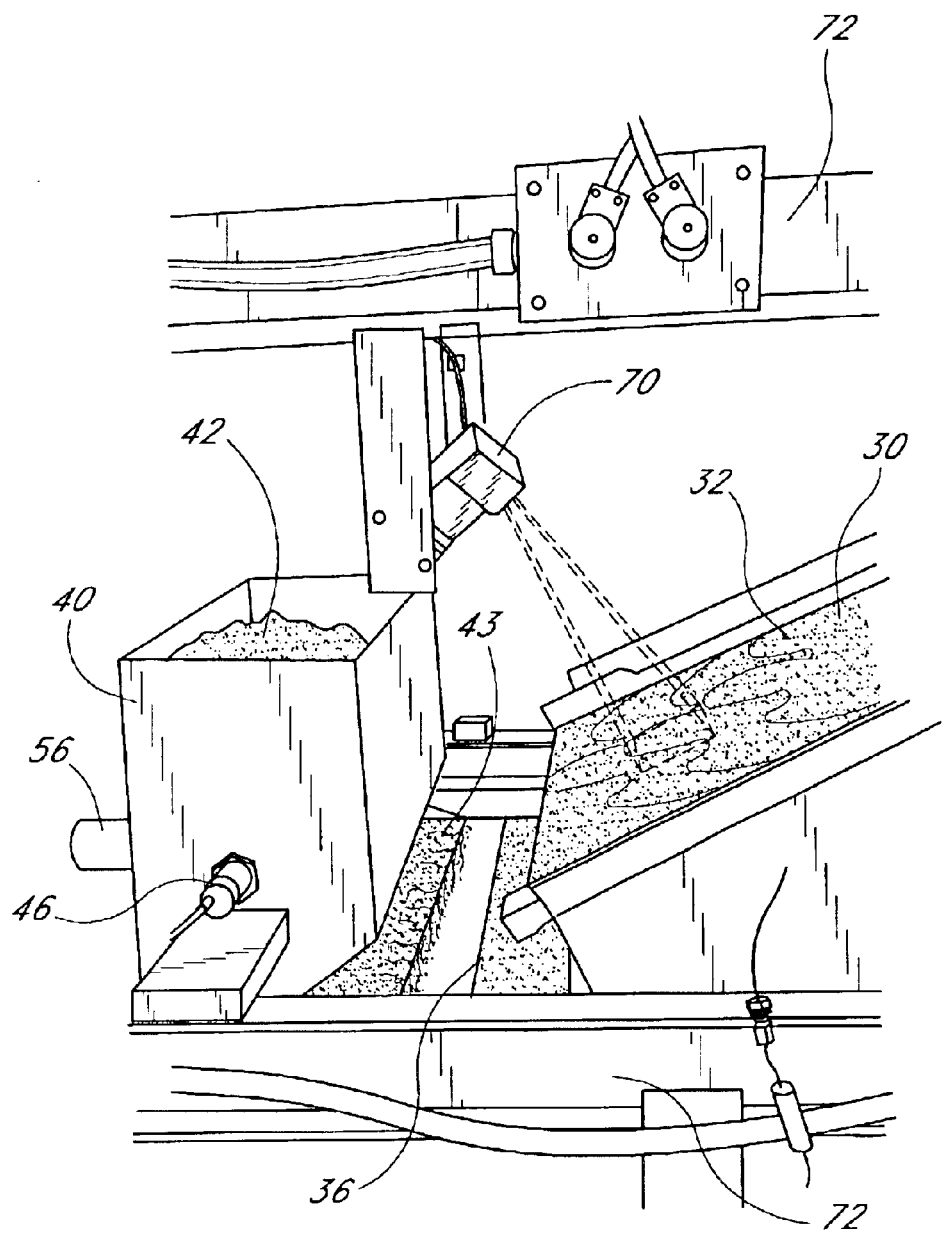
FIG. 7 is a perspective view of a portion of the apparatus of FIG. 1.

The melted sugar 32 flows by gravity off the plate 30, into reservoir 36. Referring to FIGS. 1–2 and 5–7, the reservoir 36 comprises an elongated trough or container having an open top through which the melted sugar 32 is received as it flows off the plate 30. Through holes or openings 80 in the reservoir 36, melted sugar 32 flows onto hams 22 as the hams pass below the openings 80. Referring to FIG. 6, the reservoir 36 has four sides 36a–d, with an open top. The reservoir 36 has enclosed ends 36 e–f to form an enclosed container with an open top formed between sides 36a and 36d. The sides 36a and 36d are opposite to each other and generally parallel, with the interior sides 36b and 36c being angled so they abut at an angle, preferably of about 60°, with sides 36a and 36d joining the sides 36b and 36c, respectively, also at about 60°. If you added two more sides the container 36 would form a hexagon in cross-section with each side about 3 inches wide. The reservoir 36 needs to be long enough to receive the melted sugar from the plate 30.

The ends 36e–f are rotatably mounted so they can pivot or rotate about a horizontal axis along the length of the reservoir 36, through pivots 82 on each of the ends 36e–f. Openings 80 are formed in side 36b, adjacent the juncture with side 36a. The openings 80 are located relative to the pivot axis through pivots 82 so that in a first, fill orientation they are located at or above the pivot axis 82 to retain the contents of reservoir 36, and in a second, pour orientation they are located below the pivot axis 82 to dispense the contents of the reservoir 36.

In this configuration, the reservoir 36 always has an opening 83 through which melted sugar 32 can flow into the reservoir, and it has openings 80 through which melted sugar 32 can be poured onto the hams 22 when desired. Advantageously, the melted sugar 32 accumulates in the reservoir 36 until the level of the sugar 32 reaches the bottom of the holes 30, at which point the reservoir is rotated into its second, pour orientation to pour the melted sugar onto the hams 22 as they pass below the openings 80. The reservoir 36 is then rotated into the first, fill orientation to accumulate additional melted sugar. In the depicted configuration, there is about 60° of rotation about the axis through pivots 82, between the fill position and the pour position.

Figure 8:
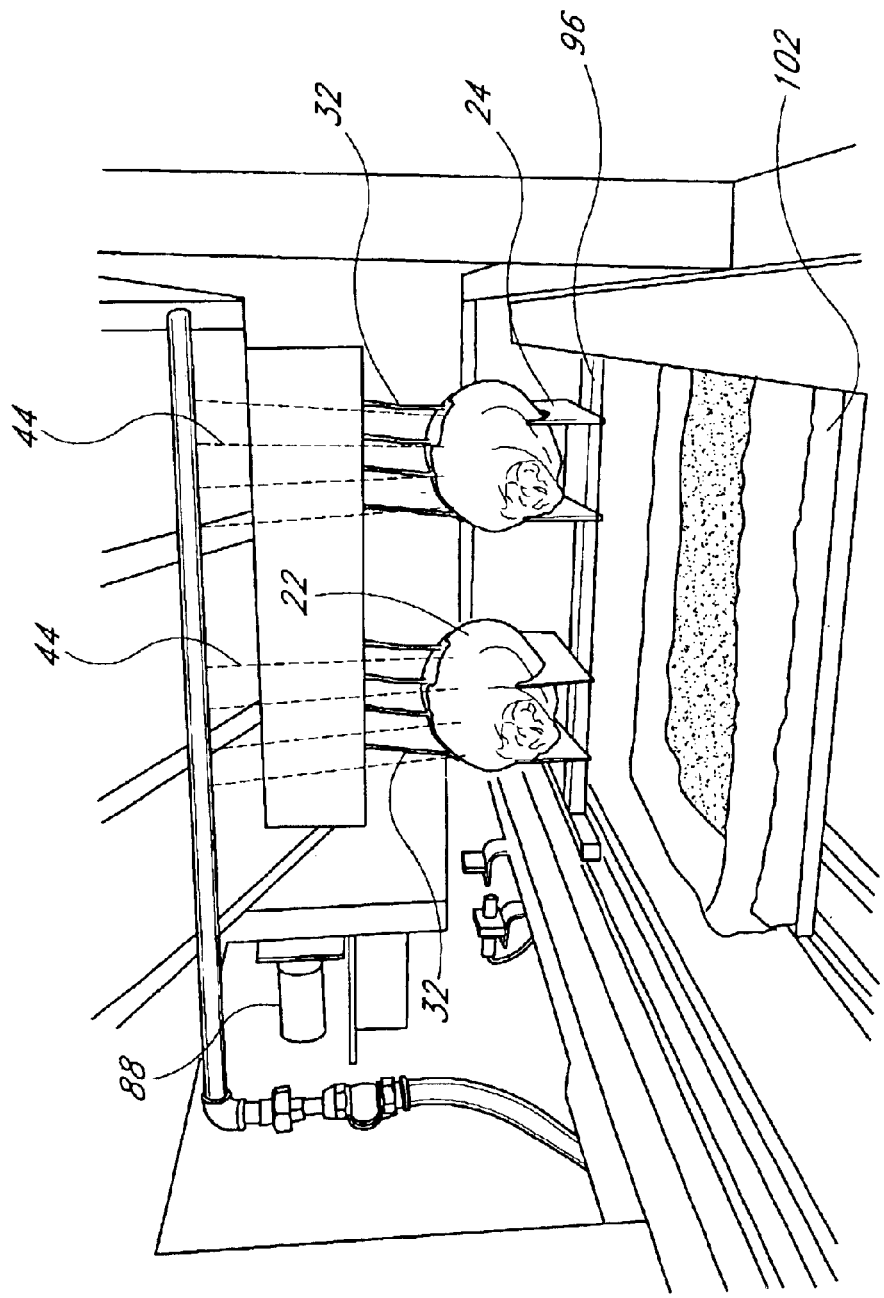
FIG. 8 is a perspective view of a portion of the apparatus of FIG. 1 showing the liquid spray.

Referring to FIG. 8, the openings 80 are located vertically above the location of the hams 22 as they pass below the openings, so that melted sugar 32 can flow by gravity out of the openings 80 onto the hams 22 when the reservoir 36 is rotated to the second, pour position. The size of the hams 22, and the location of the hams 22 on the carriers 24 of conveyor 26 will vary. Thus, the number, size and location of the openings 80 can vary. Advantageously, four openings 80 are used for each ham 122, with the openings comprising circular holes about ⅜ inch (0.375 in.) diameter, and with about two inches between centers of the holes 80. In the specifically described embodiment, two hams 122 are carried side-by-side on the conveyor 26, so there are eight openings 80, to produce aligned streams of melted sugar 32 perpendicular to the path of conveyor 26. The two sets of four openings 80, are separated by about 4 inches, to allow for some spacing between adjacent hams 22.

The reservoir 36 is preferably made of stainless sheet steel, or other materials compatible with handling edible, melted sugar at up to 500° F. Advantageously, a heater, such as resistance heater 84 (FIG. 6), is placed on the reservoir 36 to maintain the temperature of the melted sugar 32. Further, during startup, the heater 84 can ensure that any partially melted sugar reaching the reservoir 36 is further melted. Advantageously the heater 84 is placed on the side 36b, adjacent the openings 80, to ensure heating by the dispensing holes to melt any clumps of unmelted sugar and to keep the openings 80 unclogged.

A thermocouple 86 is advantageously spaced inward from the free edge of the wall 36d to measure and control the temperature of the reservoir 36 to be about 340° F. It is possible to place a sensor on the reservoir 36 to indicate the level of the melted sugar in the reservoir 36. To achieve such a liquid level measurement, a sensor is advantageously placed slightly below (about ½ inch) the horizontal plane through the bottom of the openings 80 when the reservoir 36 is in the fill position, as shown in FIG. 6.

Advantageously, the reservoir 36 is made to oscillate, side-to-side, through a stroke of about one inch (2.5 cm) at a rate of about 124 cycles per minute. This forms undulating streams of melted sugar when in the pouring position, and help disperse the melted sugar on the meat being coated. As conceptually shown in FIG. 5, an offset linkage mechanism 91 mounted on the frame and driven by motor 89 can be used to cause the oscillation.

A motor 88 (FIG. 8) is mounted to frame 72 and connected to one of the ends 36e–f to rotate the reservoir 36. The rotation is controlled by the computer or PLC 38 or by switches on the conveyor 26 or by sensors on or by the conveyor 26. The electrical connection to the resistance heater 84 is achieved by using a slip ring. Advantageously, the slip ring accommodates lateral movement along the rotational axis through pivots 82, as well as accommodating rotational movement. The electrical connection at the pivots 82 also provides electrical communication to the thermocouple(s) 86. An electrical connection sold by Mercotac is believed suitable for the specifically described embodiment.

The reservoir 36 will pour one or more streams of melted sugar 32 onto the hams 22. The temperature of the melted sugar 32, the size and location of the openings 80 relative to the ham 22, are preferably selected to retain as much of the melted sugar on the ham as possible. The melted sugar 32 that runs off the ham 22 is waste, that collects in one or more drip containers 102 (FIG. 8) placed below the conveyor 26.

A direct flow path for the sugar 32 from the melting plate 30 to reservoir 36 is thus provided by placing the reservoir 36 directly below the plate 30 and having an opening of the reservoir always available to receive flow from the plate. An indirect flow path could be used in which a channel or tube (not shown) guides flow from the plate 30 to a location for dispensing the melted sugar over the hams 22, but the direct flow is preferred.

There is thus provided means for continuously receiving melted sugar from the plate 30, means for dispensing melted sugar 32 onto the ham 22 and means for varying the amount of melted sugar that is dispensed.

Spice Dispenser

Referring to FIGS. 1–2, 7, and 9–10, the sugar and spice mixture 42 is contained in second hopper 40 having parallel side walls connected to a converging, funnel-like bottom that ends in a slot extending roughly the length of the hopper. A second dispensing pan 43 is placed below this slot. The second pan 43 could be horizontal, but is preferably slightly inclined to allow the mixture 42 to flow off a free end of the plate onto the hams 22 travelling below the plate. One or more vibration units 56 control the flow of the spice mixture 42 off the pan 43. The edge of the pan 43, off which the spice mixture 42 is dispensed, is preferably of sufficient length to dispense the mixture onto the hams 22 to be coated. It can be slightly shorter if the spice stream disperses on contact with the ham 22. A pan 43 about 15 inches long is believed suitable for coating two nested hams 22.

Advantageously a sensor 46 (FIG. 7) is located in the second hopper 40 to monitor the level of the spice mixture 42. If the level drops too low, an audio and/or visual warning is given so the hopper can be refilled. Preferably, if the level drops too low, the system will be shut down in a manner similar to that achieved by sensor 61 on the first hopper 34 as discussed above.

The location of the stream of dispensed spice mixture 42 can vary, but it is preferably close enough to the streams of melted sugar 32 that the spice mixture 42 will adhere to the melted sugar 32 and remain on the ham 22. The mixture 42 that falls off the ham 22 is waste that collects in one or more drip containers 102 placed below the conveyor 26. Further, to avoid waste, the vibration units 56 on the second hopper 40 are controlled by the computer or PLC 38 or by switches on the conveyor 36, so that the spice mixture 42 is dispensed only when the hams 22 on conveyor 26 are positioned to receive the spice mixture. For the specifically described embodiment, dispensing the spice mixture 42 at about 0.8–10 pounds per minute is believed suitable.

The spice mixture 42 will vary with the meat to be coated. Preferably the mixture contains granules of sugar of sufficient size that not all of the granules melt completely during the coating process. The unmelted granules give an uneven variation to the glaze, and cause the glaze to break into uneven size pieces. If the glaze is of uniform thickness of completely melted sugar then it will break off in large chunks so that each sliced piece of meat will not have any glaze on it. The variation caused by unmelted granules allows each sliced piece of meat to retain a portion of the glaze. A mixture of 48 ounces of spice with 50 pounds of confectioners sanding sugar is used with the specifically described embodiment.

The type of sugar used is believed to affect the performance of the coating. The sugar is preferably confectioners sanding sugar. Such sugar purchased from California and Hawaiian Sugar Co., Inc. in California has been successfully used. It has a color (1000a$^s$420) of 9 maximum, with a grain size (U.S. series) of 25% maximum on U.S. 20, and 6% maximum thru U.S. 40. It is 99.98% sugar, with about 0.015% moisture. The average color is 6, and the average grain size is 12.7% US 20, 48.6% US 30, 36% US 40, 2.4% US 50 and 0.3% thru US 50.

The type and mixture of spices used will vary widely, depending in part on the meat to be coated and the particular taste to be imparted. A spice using varying portions of sugar and other spices is believed suitable. The composition of the spice will vary according to taste. The composition of the spice is not believed to be important, but the fact that the spice is mixed with granulated sugar when dispensed onto the meat is important. One particular spice found useful for coating ham includes a mixture of the following items, listed in order of weight: sugar, gelatin, honey powder (honey, high fructose corn syrup, wheat starch, corn syrup, soy flour), paprika, dextrose, spices and natural flavorings.

There is thus provided means for dispensing powdered spice onto the ham 22 and means for varying the amount of spice dispensed.

Cooling Fluid

Referring to FIGS. 1 and 8, one or more jets of cooling fluid 44 are sprayed onto the ham 22 to help the melted sugar 32 and the spice mixture 42 stay on the ham 22. Preferably, a jet of cooling liquid 44, such as water, is located below, and aligned with, each of the openings 80 in reservoir 36. This requires placement of nozzles 90 to spray each jet of liquid 44. Preferably, the cooling fluid 44 is a liquid, and more preferably it is water, although other liquids could be used, such as spiced or flavored water, or a liquid sweetener. Further, the cooling fluid 44 could be a gas although the gas is less preferable because it does not cool as fast as a liquid of the same temperature. The nozzles 90 are placed in fluid communication with a source of fluid and pressurized to a desired pressure, by means known in the art and not described herein.

While separate nozzles 90 with separate pressurization pumps for one or more nozzles could be used, advantageously the nozzles 90 comprise a pipe with a series of holes orientated to spray the ham 22. The pipe is preferably perpendicular to the path of conveyor 26. Holes about 1/16 inch in diameter on a quarter inch water line at 60 psi, are believed suitable, with the water at the local environmental temperature. Preferably, the cooling fluid 44 is not at a high enough pressure to force melted sugar 32 or the spice mixture 42 off the ham 22. Various changes in the sources of the cooling fluid 44, in the temperature of the fluid, and in the location and configuration of the nozzles 90 can be made depending on the meat to be coated and the goal of coating the glaze to reduce runoff.

The stream(s) of cooling fluid 44 are directed so as to increase the amount of glaze remaining on the ham 22. The glaze comprises the melted sugar 32 and the spice mixture 42. Preferably, the melted sugar 32 melts some of the sugar in the spice mixture 42, but does not completely melt all of it. If the spice mixture 42 contains granular spice that melts with the melted sugar 32, that should also work to provide a glaze that breaks into small pieces so as to adhere to each slice of ham.

The spray of cooling fluid 44 is directed toward a location on the ham 22 in the area where the mixture 42 and the melted sugar 32 hit the ham. The spray of the fluid 44 is controlled by the computer or PLC 38 or by switches on the conveyor 26, so that it begins shortly after the melted sugar 32 hits the ham 22. A 0.2 second delay is believed suitable. This cools the melt and reduces run-off in order to increase the amount of sugar and spice retained on the ham 22. The spray of cooling fluid 44 is preferably shut off when pouring of the melted sugar 32 is stopped, but the spray could continue to be used to cool the glaze if desired. The timing and location of the application of the cooling fluid 44 can vary.

There is thus provided means for cooling the glaze to increase the amount of glaze remaining on the ham 22.

Conveyor

Figure 4:
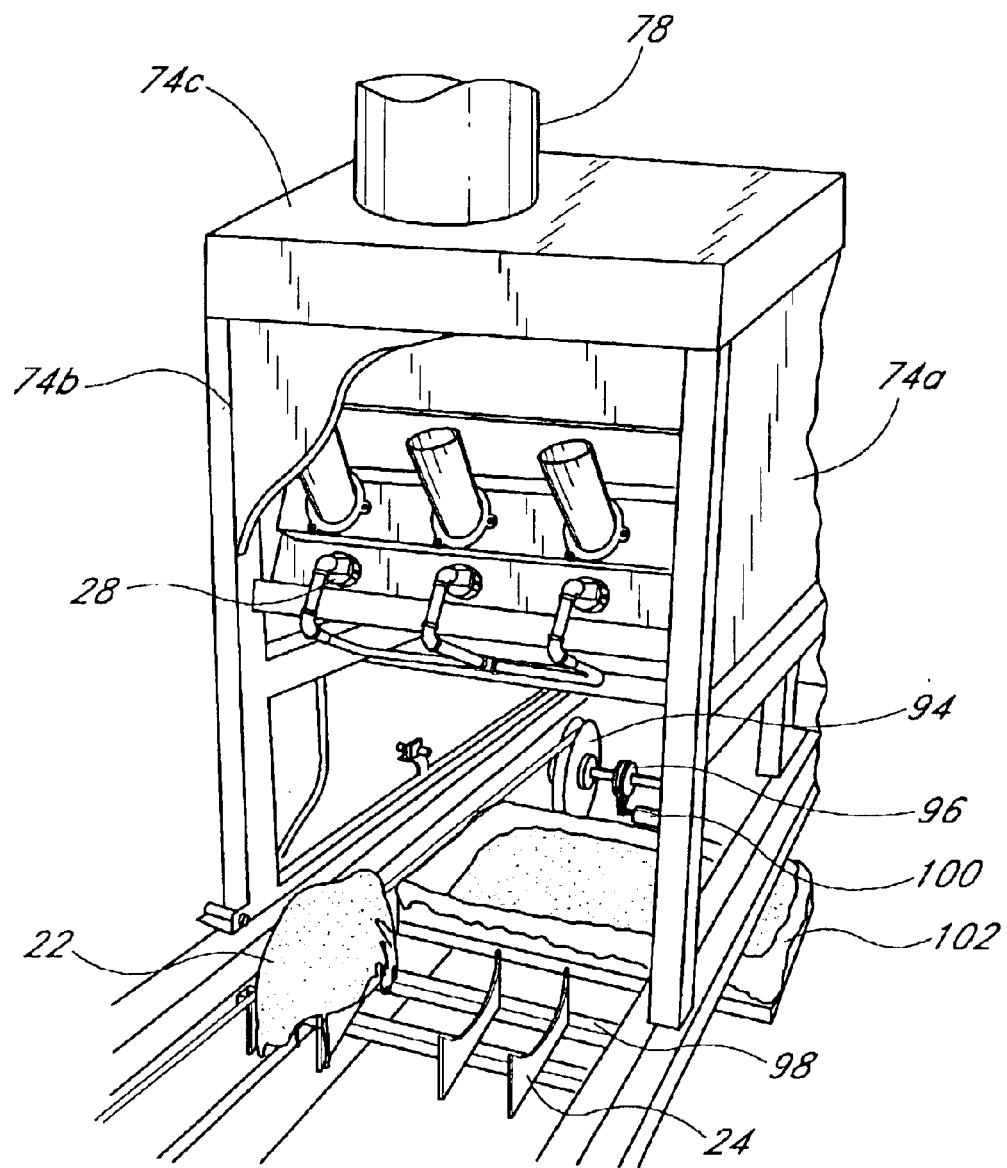
FIG. 4 is a perspective view from one end of a portion of the apparatus of FIG. 1.
Figure 5:
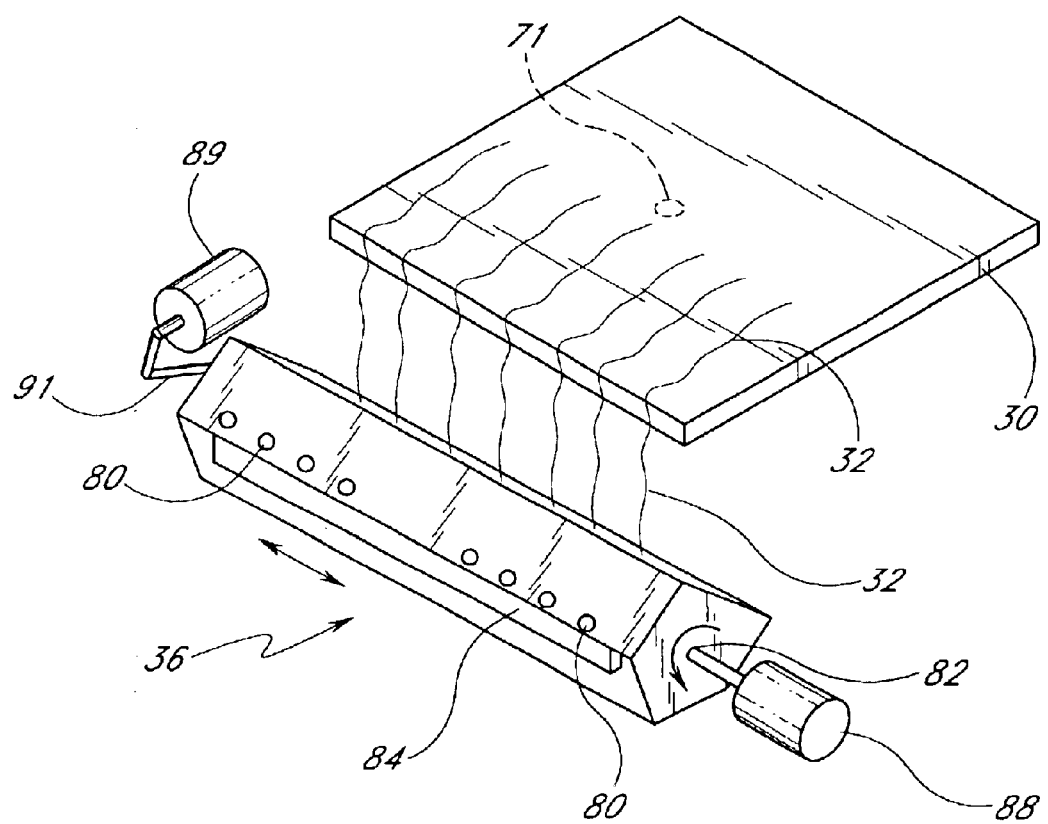
FIG. 5 is a perspective view of a heating plate and reservoir as used in the apparatus of FIG. 1.

Referring to FIGS. 1–2 and 4, the conveyor 26 is configured to carry the hams 22 through the locations where the ham is coated with melted sugar 32 and with spice 42 in order to glaze the ham. A straight conveyor that changes direction is believed suitable, and offers some advantages but other conveyors could be used. The conveyor 26 has a pair of sprockets 94 at each end, about 12 inches in diameter, with the sprockets 94 being joined by axles to synchronize the sprocket rotation. A conveyor 26 about eight feet between sprockets 94 is believed suitable, providing for a very compact glazing machine.

Each sprocket 96 engages an endless chain 97 to which are fastened cross-bars 94. The racks 24 that hold the hams 22 are connected to the cross-bars. The racks 24 will vary in shape with the meat to be held. For ham 22, the racks 24 are rectangular strips that have a length along the length of the conveyor and a shorter width extending vertically, and that have a curved recess cut into the rectangle on the upper side. Each rack 24 in a pair of racks are spaced apart about 4–5 inches. The curves are sized to hold a whole ham 22 that is placed on a pair of racks 24. Advantageously the racks 24 are angled at an angle of about 30° to a line across the conveyor that is aligned with the rotational axes of the sprockets 94.

Advantageously four racks 24 are placed in line across a width of the conveyor 26. A ham 22 is placed on each pair of racks 24. To reduce waste the hams 22 are preferably orientated so occupy as much of a given area as possible. Thus, the ham 22 on one rack 24 is nested with the thick end adjacent a narrow end of the ham on the adjacent rack 24.

The conveyor 26 has a first, loading end 95 that projects beyond the heater 28 and is accessible by one or more workers who manually place the hams 22 on the racks 24. A second, distal end of the conveyor 26 is located beyond the second hopper 34. Drive sprocket 98 on one of the shafts connecting two of the sprockets 96 is driven by a reversible motor 100 (FIG. 4) to rotate the conveyor 96 in either direction along the length of the conveyor 26. A 0.25 hp, 40 RPM gear motor 100 with an effective gear reduction of about 6:1 drives the sprockets 96 and conveyor 26.

Below the path of the conveyor 26 are placed one or more drip containers 102 that extend the length of the conveyor 26 is traveled by the hams 22. The containers 102 collect the melted sugar 32, mixture 42 and cooling fluid 44 that does not stick to the hams 22. The contents of the drip containers may be recycled to recover some of the contents, but it cannot be reused to coat hams 22.

Preferably, a mechanical limit switch 132 (FIG. 11) is used to limit the motion of the conveyor 26. By placing a projection on one of the chains 97 located to hit an electrical contact on frame 72 around the conveyor 26, the motor 100 can be controlled to stop the conveyor 26 when the racks 24 are at the first, loading end. Similarly, a limit switch having a projection on one of the chains 97 located to hit a different electrical contact on the frame 72 around the conveyor 26 can be used to stop the conveyor when the racks 24 are at the distal end of the conveyor and to reverse the direction of the conveyor and move the racks 24 toward the loading end. Various other projections on the chains 97 cooperating with switches on frame 72 can be used to activate and deactivate various components. Similarly, position sensors on frame 72 detecting the position of racks 24 or meat 22 could be used. While a single, reversible conveyor is shown, other conveyor configurations can be used, such as a continuous circle or a longer conveyor with multiple coating stations. Similarly, electronic controls or computer controls can be used instead of mechanical limit stops.

There is thus provided means for conveying meat along a predetermined path.

Operation

The operation will be described using a combination of mechanical limit switches and PLC 38 controls to regulate various components. Because the relative locations and geometry of the conveyor 26, racks 24, reservoir 36, the second hopper 40 and the cooling fluids 44 are known, it is possible to use mechanical or electrical switches on the conveyor to control the timing and operation of the reservoir to dispense melted sugar, of the second hopper to dispense spice mixture 42, and of the cooling jets 44 to cool the glaze and reduce run-off. It is also possible to use position sensors detecting the position of rack 24 to activate these components. It is also possible to control the operation of these components by the PLC 38. Thus, the control of the above components in the sequence given below can be varied by the PLC 38 or by various switches actuated by the conveyor 26 or sensors activated by the racks 24 or ham 22 or other markers on the conveyor 26.

The heaters 28 are turned on to heat plate 30. A thermocouple in the plate 30 monitors the temperature and sends a signal correlated to the temperature to the PLC 38. When the temperature reaches about 400° F., the first hopper 34 begins reciprocating and dispensing sugar onto the plate 30. At 470° F. or whatever the set point of the heater controller, the temperature control is then switched to sensor 70. The heater 84 on the reservoir 36 is activated at the time the glazer is turned on and set to maintain a temperature of about 340° F. Melted and partially melted sugar 32 flows off the plate 30 into reservoir 36, where the heater 84 further melts any unmelted sugar 32. The sensors 70 in cooperation with the PLC 38 control the hopper 34 to provide uniform distribution of sugar 32 onto the plate 30 at a rate that leads to continued melting of sugar without burning.

A worker has manually placed a whole ham 22 onto each of the two racks 24. When a condition of full reservoir 36 with proper fluidizing of the melted sugar 30 is observed, the worker presses an activation button which signals the PLC 38 to move the conveyor 26 by activating motor 100 to rotate drive sprocket 96, sprockets 94 and chain 97. This provides a manual, visual inspection before starting the glazing machine. Alternatively, an automatic conveyor which reads the signal could directly activate motor 100. The ham 22 is moved at a speed corresponding to about 90% maximum motor power until the ham is just below the reservoir 36, at which time the PLC 38 slows the conveyor 26 down to a speed corresponding to about 50% motor power.

As the ham 22 passes below the reservoir 36, the PLC 38 or a switch on conveyor 26 or a position sensor causes motor 88 to rotate the reservoir causing melted sugar 32 to flow out openings 80 down onto the ham 22. The PLC 38 or another switch on conveyor 26 causes motor 88 to rotate the reservoir 36 back to the fill position when the ham is past the pour location. The timing preferably accounts for the time it takes the melted sugar 32 to leave the reservoir and reach the ham 22 in order to reduce waste.

Shortly after the melted sugar 32 hits the ham 22 the PLC 38 or a switch on conveyor 26 or a position sensor causes the cooling fluid 44 to be sprayed onto the ham in order to cool the melted sugar and reduce run-off. A delay of about 0.2 seconds is believed suitable. Shortly after the melted sugar 32 hits the ham 22 the PLC 38 or a switch on conveyor 26 or a position sensor activates the second hopper 40 and its vibration unit 56 to dispense the spice mixture 42, so the mixture hits the ham just as or slightly before the portion covered by melted sugar passes below the hopper 40. The spice mixture 42 sticks to the melted sugar 32 to form a first layer of glaze on the ham 22. The PLC 38 or another switch on conveyor 26 or another position sensor gives a signal that shuts off the hopper 40 and its vibration unit 56 so the stream of spice mixture 42 stops just about the time the ham 22 passes by in order to avoid wasting the mixture 42. The melted sugar 32 and mixture 42 that does not remain on the ham 22 falls through and below the conveyor 26 into drip container(s) 102.

At this point, the PLC 38 or a limit switch on chain 97 stops the motion of conveyor 26, and reverses it, sending a signal to the PLC 38. The glazed ham 22 now moves in the opposite direction for another coating.

As the ham 22 passes below the hopper 34 for the second time, the PLC 38, a switch on conveyor 26 or a sensor activates the hopper and its vibration unit 56 to cause spice mixture 42 to be dispensed onto the ham 22 just as it passes below the dispensed mixture 42, the spice mixture sticking to the first coating of glaze on the ham. The PLC 38, a switch on conveyor 26 or a sensor also rotates the reservoir 36 so that melted sugar hits the ham and entrains the spice mixture 42 onto the ham to form a second layer of glaze on the ham 22. The cooling fluid 44 is also activated by the PLC 38 or a switch on the conveyor 26 or a position sensor to cool the glaze. The PLC 38 or a switch on the conveyor 26 or a position sensor stops the dispensation of the spice mixture 42 and stops dispensation of the melted sugar 32 when they will no longer hit the ham 22. The cooling fluid 44 is also shut off by the PLC 38, a switch on the conveyor or a position sensor about the time the melted sugar 32 is shut off.

The coating sequence is preferably repeated again to provide four layers of glaze on the ham 22. To do this, each time the racks 24 reach the distal end of the conveyor 26, a signal is sent to the PLC 38 which counts the number of passes and controls the number of coatings applied. But the number of times through the coating sequence can be varied as desired. It is believed desirable to have about 1.25–1.5 pounds of glazing for each whole ham 22. After the desired number of glazings are applied, the conveyor 26 moves the racks 24 to the loading station 95 where the hams 22 are manually removed. The sequence may then be repeated after a green light illuminates, following a sufficient delay for the reservoir to refill.

The coating is very fast, taking only 3–4 seconds to pour the melted sugar 32 onto ham 22. The oscillation of the reservoir 32 causing the streams of melted sugar 32 to oscillate improves the dispersion of the sugar over the meat and improves coating. The plate 30 produces a rapid stream of melted sugar 32, and the reservoir 36 may be rapidly refilled to provide further coatings. Alternatively, additional reservoirs could be provided or a larger reservoir with openings that are actively opened and closed could be used.

Controls

Figure 10:
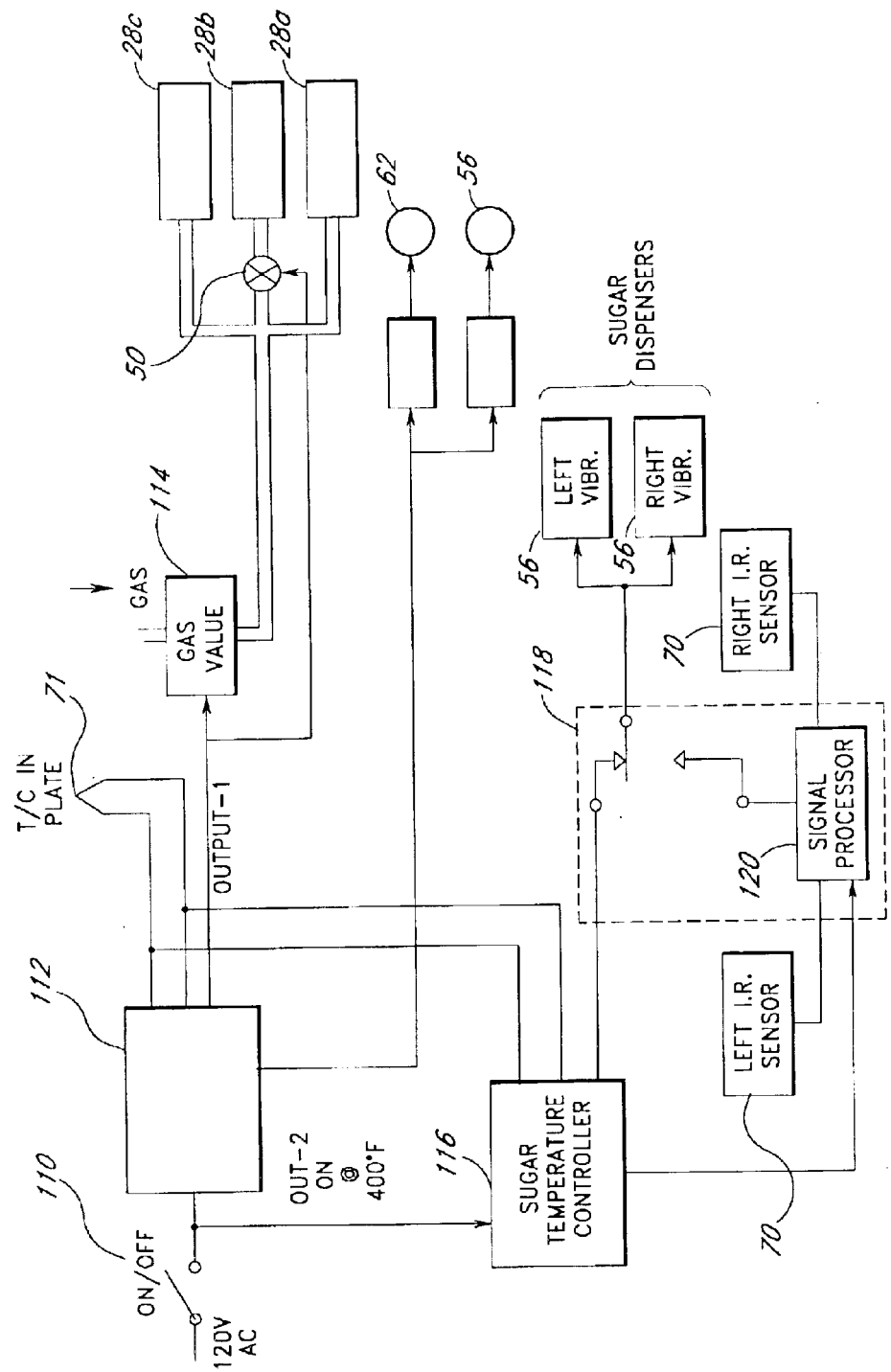
FIGS. 10–11 are schematics of a control system for the apparatus of FIG. 1.
Figure 11:
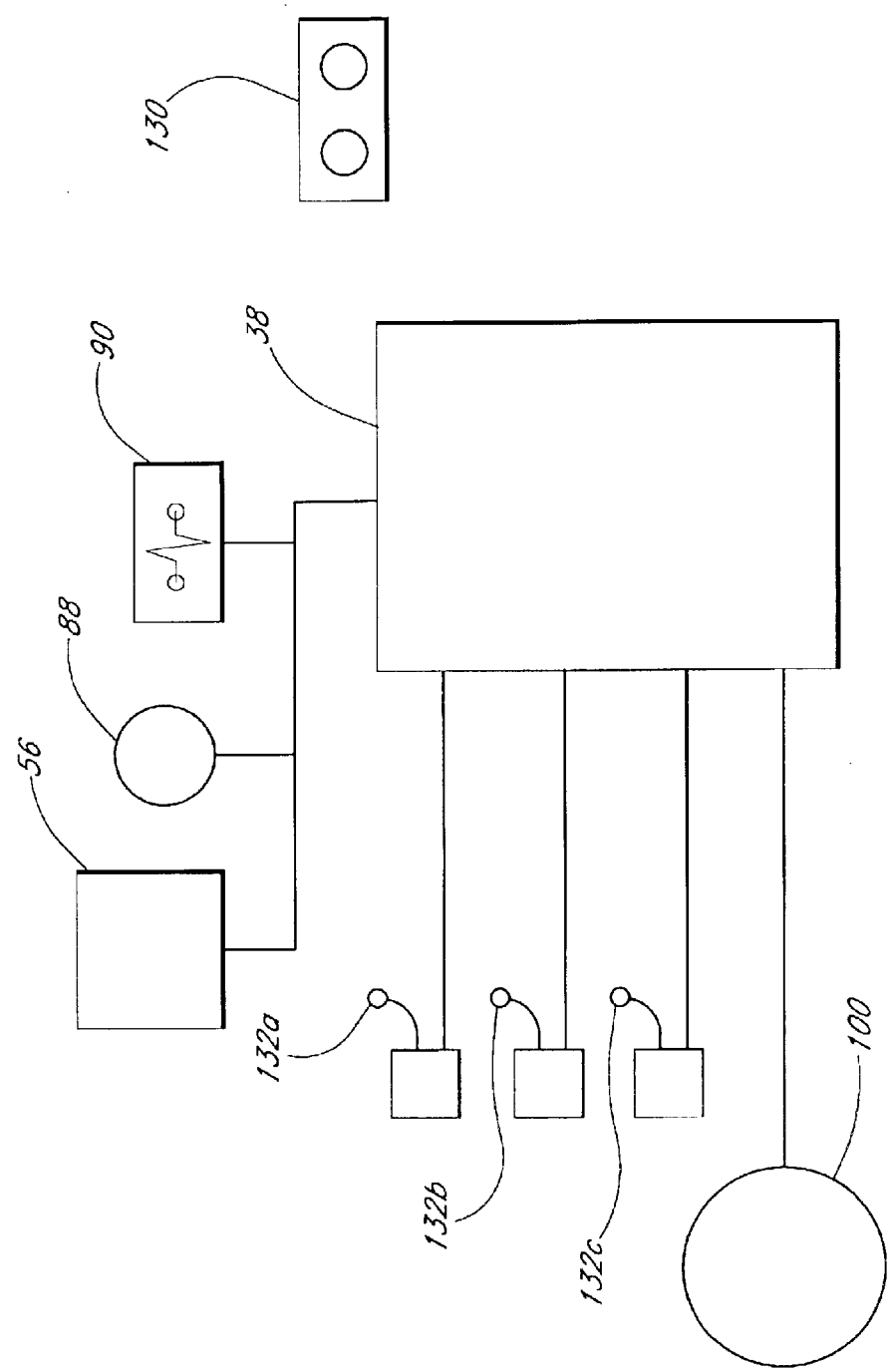

A schematic of the basic control system is shown in FIGS. 10–11. A switch 110 activates the coating apparatus. Upon activation of the switch 110, the burner temperature controller 112 activates the heaters 28a–28c. The controller 112 receives a signal from thermocouple 71 in the plate 30 indicative of the plate temperature. When the temperature as reflected by thermocouple 71 reaches a predetermined value, preferably about 400° F., the controller 112 activates the sugar hopper motor 62 which begins the oscillation of the hopper 34 across the plate 30. Advantageously, at the same temperature the controller 112 also activates the reservoir oscillator motor 56 that begins oscillation of the reservoir 36 and activates the heater 84 on the reservoir. Based on the signal from the thermocouple 71, at a predetermined set point, preferably about 470° F., the controller 112 will deactivate one or more of the burners 28a–28c to limit the temperature of the plate 30. Preferably the middle burner 28b is deactivated by shutting off valve 50. Other heaters could be controlled, and if desired one or more heaters could be partially deactivated to vary the heat produced by one or more of the heaters. The controller 112 also controls a main gas shut off valve 114 to stop heating entirely in the event the need arises, such as the hoppers 34 running out of sugar.

Activation of the on-off switch 110 also activates the sugar temperature controller 116, which also receives signals from thermocouple 71 in plate 30. The sugar controller 116 activates the vibratory motors 56 on hopper 34 to dispense sugar onto plate 30 at a predetermined temperature, preferably in the range of about 400–450° F., based on the signal from the thermocouple 71. When the temperature of plate 30 reaches a predetermined temperature, preferably about 470° F., a change-over control relay 118 switches control of the vibratory motors 56 from the controller 116 to a signal processor 120 which receives input signals from sensors 70 indicative of the temperature of the melted sugar on the plate 30. The signal processor 120 then varies the vibratory motors 56 to vary the amount of sugar dispensed onto the plate 30. The controller 112, change-over relay 118 and signal processor 120 are preferably located in and comprise part of the programmable logic controller (PLC) 38.

FIG. 11 shows a basic control system by which the PLC 38 activates the conveyor 26 and other components. The PLC 38 controls the operation of the vibration motors 56 on hoppers 34 and 40 to dispense sugar 32 and spice mixture 42, and also controls the cooling liquid dispensed through nozzles 90. An on-off switch 130 adjacent the conveyor 26 sends a signal to the PLC 38 to activate or stop the conveyor 26 depending on the signal the PLC 38 sends to motor 100 that drives the conveyor. Mechanical limit switches 132 comprising projections or pegs on the conveyor 26 or conveyor chain 97 cooperating with sensors on the frame 72 adjacent the projections or pegs are used to coordinate the activation of devices based on the position of the conveyor and meat 22 placed at known locations on the conveyor. Thus, the limit switches 132a can be used to rotate the reservoir 36 when the ham 22 is physically below reservoir 36 to dispense melted sugar onto the ham, and to rotate the reservoir into a non-dispensing position when the ham has past. This is achieved, for example, when a peg is located on the chain 97 adjacent the position of a ham 22 placed on the conveyor, with the peg hitting and activating an electrical switch to cause the reservoir 36 to rotate. Similarly, limit switch 132b can reverse the motor 100 and cause the conveyor 26 to change direction. Likewise, limit switch 132c can stop the conveyor motor 100 and stop conveyor 26 when the ham 22 is at the unloading station (FIG. 1). Of course, other types of switches and sensors can be used to activate various components of the equipment based on the position of the ham 22 or the racks 24. Such other sensors include proximity sensors, optical sensors, capacitance sensors etc. But mechanical switches are simple and reliable and thus preferred.

The above description is given by way of example, and not limitation. Given the above disclosure, one skilled in the art could devise variations that are within the scope and spirit of the invention, including various ways of controlling the sequence of events or of arranging the coating components like the hoppers 34, 40, reservoir 36 and cooling streams 44, relative to the conveyor 26 and ham 22. Further, the various features of this invention can be used alone, or in varying combinations with each other and are not intended to be limited to the specific combination described herein. Thus, the method and apparatus for melting sugar has separate application for other uses. The invention is not to be limited by the illustrated embodiments but is to be defined by the following claims when read in the broadest reasonable manner to preserve the validity of the claims

What is claimed is:

1. An apparatus for coating a piece of meat, comprising:
   a source of sugar;
   a heated surface for melting said sugar;
   a control system comprising a sensor configured measure a control parameter associated with the sugar, wherein the control system, in response to the control parameter, is adapted to cause said sugar to melt on the surface without burning the sugar; and
   a reservoir in fluid communication with the heated surface, the reservoir being sized to contain a sufficient volume of melted sugar to coat a surface of at least one piece of meat with the melted sugar, the reservoir being configured to dispense the melted sugar onto the at least one piece of meat.

2. The apparatus of claim 1, wherein the sensor is adapted to detect a property of the sugar on the surface.

3. The apparatus of claim 2, wherein the heated surface comprises a gas-fired hot plate adapted to allow the temperature of the plate to be electronically controlled to prevent burning of the sugar.

4. An apparatus for coating food product, comprising:
   a source of sugar;
   a heated surface adapted to melt the sugar without burning the sugar; and
   a reservoir in fluid communication with the heated surface, the reservoir being configured to dispense the melted sugar onto at least one food product;
   wherein the source of sugar is adapted to deposit sugar onto the heated surface in response to a control parameter measured by a sensor and communicated by a controller.

5. The apparatus of claim 4, wherein said sensor comprises an electronic eye directed at said heated surface, said electronic eye being in electronic communication with a controller.

6. The apparatus of claim 5, wherein the controller is adapted to vary a quantity of sugar supplied by the source to the heated surface in response to a signal from the electronic eye.

7. The apparatus of claim 6, wherein the heated surface comprises a gas-fired hot plate.

8. The apparatus of claim 2, wherein the source of sugar is adapted to deliver sugar to the plate in proportion to a qualitative or quantitative value of the property sensed by the sensor.

9. The apparatus of claim 2, wherein the sensor is an optical infrared sensor.

10. A method of coating a food product with a sugar glaze, the method comprising:
    providing a source of sugar;
    providing a heated surface;
    maintaining a temperature of said heated surface within a predetermined range of temperatures;
    depositing a quantity of sugar onto said heated surface; and
    electronically controlling at least one of a temperature of the heated surface and a rate of deposition of said sugar onto said surface such that said sugar is melted but not burned on said surface;
    directing said melted sugar to coat a food product.

11. The method of claim 10, wherein said source of sugar comprises a vibrating hopper.

12. The method of claim 10, wherein the heated surface comprises a gas-fired hot plate.

13. The method of claim 10, wherein controlling a temperature of the surface or a rate of deposition of said sugar comprises sensing a property of the sugar on said heated surface.

14. The method of claim 13, wherein said property of said sugar is associated with a granularity of said sugar.

15. The method of claim 14, wherein said property of said sugar is an optical reflectance of said sugar.

16. The method of claim 10, wherein said property of said sugar is an optical reflectance of said sugar.

17. A control system for melting a confection for delivery onto a food product, the system comprising:
    a source of an unmelted confection;
    a heated surface configured to melt the confection thereon;
    a deposition apparatus configured to deposit the unmelted confection onto the heated surface;
    a sensor configured to sense a parameter associated with the confection; and
    a controller configured to adjust either a temperature of said heated surface or a rate of deposition of the confection onto the heated surface in response to a value of said parameter.

18. The system of claim 17, wherein the confection is in a granular or crystalline form.

19. The system of claim 18, wherein the confection is a granular sugar.

20. The system of claim 17, wherein the parameter sensed by the sensor is a granularity of the confection.

21. The system of claim 17, wherein the sensor is an optical infrared sensor.

22. The system of claim 21, wherein the sensor is configured to sense an optical reflectance of the confection.

* * * * *